United States Patent
Umeda

(10) Patent No.: US 6,757,030 B2
(45) Date of Patent: Jun. 29, 2004

(54) MULTI REMOTE CONTROL TRANSMITTER, VIDEO APPARATUS, AND FORMAT PRESET SUPPORT METHOD FOR SAME APPARATUS

(75) Inventor: Shuji Umeda, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 455 days.

(21) Appl. No.: 09/962,480

(22) Filed: Sep. 25, 2001

(65) Prior Publication Data

US 2002/0036720 A1 Mar. 28, 2002

(30) Foreign Application Priority Data

Sep. 26, 2000 (JP) ............................ P2000-292817

(51) Int. Cl.[7] .............................................. H04N 5/44
(52) U.S. Cl. ........................................ 348/734; 725/37
(58) Field of Search .................................. 348/734, 725, 348/722, 552; 725/37, 78, 80, 133, 141, 152, 153, 132, 140; 341/173, 175, 176, 177; 340/5.22, 10.52, 825.72, 825.29, 825.69; H04N 5/44

(56) References Cited

U.S. PATENT DOCUMENTS

| | | | | |
|---|---|---|---|---|
| 5,963,624 A | * | 10/1999 | Pope ........................... | 348/734 |
| 6,021,185 A | * | 2/2000 | Staron ......................... | 348/734 |
| 6,628,344 B1 | * | 9/2003 | Weber ......................... | 348/734 |
| 6,636,273 B1 | * | 10/2003 | Weber ......................... | 348/734 |

FOREIGN PATENT DOCUMENTS

JP    Hei 6-237494    8/1994

* cited by examiner

*Primary Examiner*—Sherrie Hsia
(74) *Attorney, Agent, or Firm*—Osha & May L.L.P.

(57) ABSTRACT

A code indicating the encoding format classification is recorded in a multi remote control transmitter 10 attached to a video apparatus 20. The code is transmitted at every interval T successively. Also, at every transmission of code, an instruction of power on is transmitted in a format corresponding to the code. When the code conforming to the peripheral equipments 30, 40 connected to the video apparatus 20 is transmitted, the video apparatus is activated to input a video signal from the video apparatus to the multi remote control transmitter 10. The conformable code, together with the data for explaining a preset method of the multi remote control transmitter 10, is output in terms of the video signal to the peripheral equipments, and displayed.

5 Claims, 3 Drawing Sheets

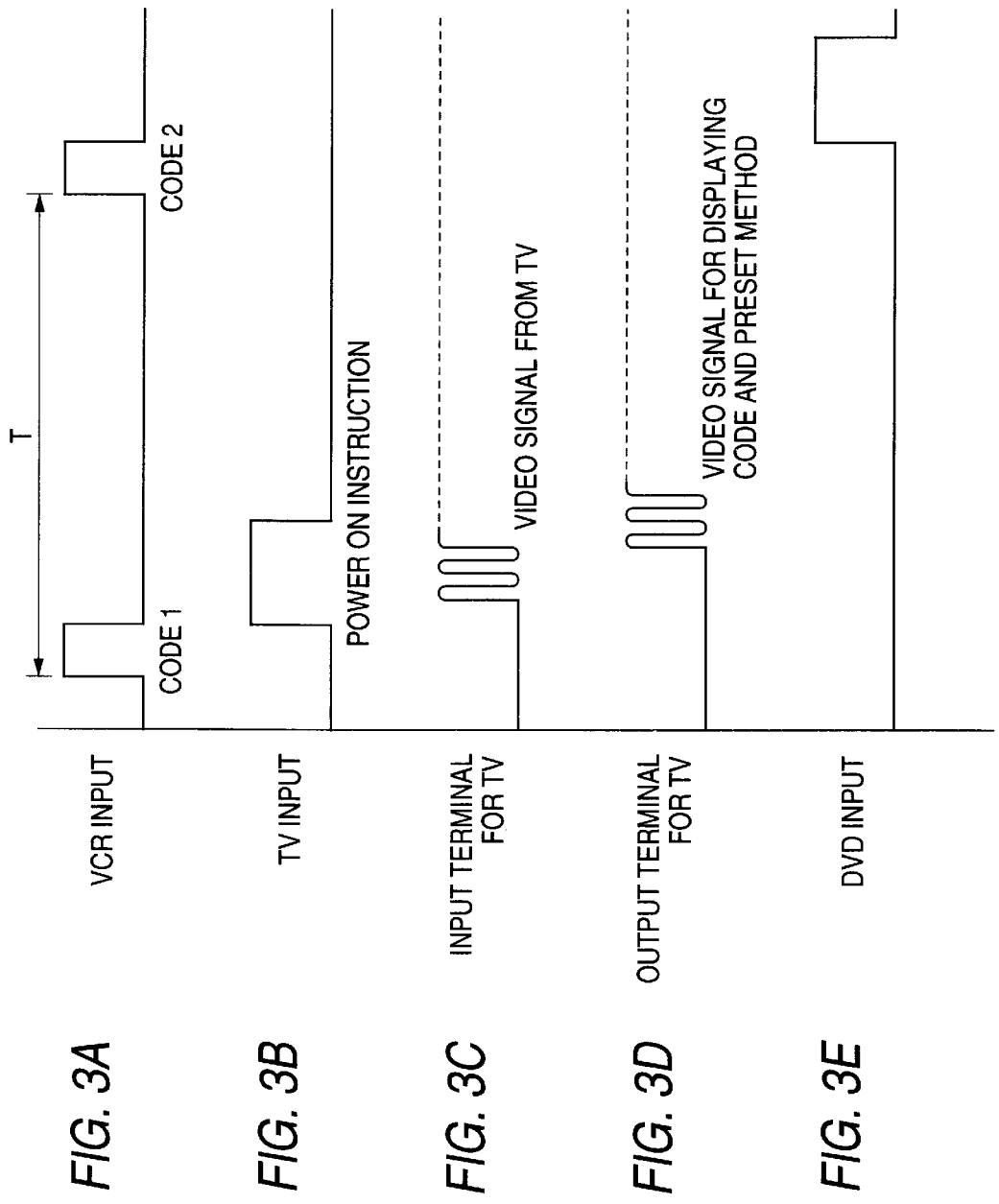

MULTI REMOTE CONTROL TRANSMITTER, VIDEO APPARATUS, AND FORMAT PRESET SUPPORT METHOD FOR SAME APPARATUS

BACKGROUND OF THE INVENTION

1. Technical Field

The present invention relates to a multi remote control device that is called a multi brand remote control (MBR), a video apparatus remotely operated by the multi remote control device, and a format preset support method for the video apparatus.

2. Related Art

Most of the magnetic recording/reproducing apparatuses are attached with a multi remote control device having a function of allowing the remote operation of the television receiver connected thereto.

The multi remote control device has a basic constitution of encoding a code corresponding to an operated key switch in a predetermined format, modulating a carrier signal in accordance with an encoded signal, and transmitting a modulated signal as the infrared signal. Since the encoding format is different for each maker or type of machine of the television receiver, it is necessary to preset the multi remote control device in a format for the television receiver to actually operate the television receiver, employing the multi remote control device.

However, for this preset, whether or not the format is applicable for the multi remote control device must be checked by investigating the maker name or type of the television receiver to be remotely operated, and the manufacturing date. Also, to investigate a preset method, the general user needs an operation manual. Therefore, when the operation manual is lost, the operation method is unknown, and further, when one maker possesses a plurality of codes indicating the format classification, it is unknown which code to select, and it is uncertain whether or not the television receiver to be remotely operated is the type of machine conforming to the multi remote control device.

To solve such inconveniences, a controller for a multi remote control device that automatically presets the format for the television receiver by encoding and outputting a key code for power on successively in plural kinds of predetermined format to the television receiver to be remotely operated, and by detecting a power on condition of the television receiver was disclosed in the Unexamined Japanese Patent Application Publication No. Hei6-237494.

Problems to be solved

With the controller for the multi remote control device as described in the Unexamined Japanese Patent Application Publication No. Hei6-237494, the format when the power on condition is detected in a process of encoding and outputting the key code for power on in plural kinds of format successively is judged as a conformable format, whereby the automatic preset of format can be made. This automatic preset can dispense with the operation manual when making the preset.

However, for this automatic preset, a sensor for sensing the power on condition for the television receiver to be remotely operated is needed on the multi remote control device separately. This sensor may be a magnetic sensor for sensing the magnetism radiated from the television receiver or a photo sensor for sensing the light emitted from a cathode ray tube or pilot lamp for the television receiver, which is considerably expensive, increasing the costs of the multi remote control device or the magnetic recording/reproducing apparatus attached with the multi remote control device.

SUMMARY OF THE INVENTION

The present invention has been achieved in the light of the above-mentioned problems, and it is an object of the invention to provide a multi remote control transmitter excellent in the economy and operability, which allows the simple selection of a format conformable to the equipments remotely operated in a simple circuit configuration without the use of an expensive sensor, and without seeing the operation manual.

It is another object of the invention to provide a video apparatus in combination with the multi remote control transmitter, in which the format of the peripheral equipments connected another way can be simply selected without the use of an expensive sensor, and without seeing the operation manual, and preset in the multi remote control transmitter.

It is a further object of the invention to provide a format preset support method for performing simply a format preset operation of the multi remote control transmitter without the use of an expensive sensor and without seeing the operation manual.

Means for Solving the Problems

To accomplish the above objects, according to the present invention, there is provided a multi remote control transmitter for a video apparatus having a function of allowing the remote operation of, in addition to the video apparatus, the peripheral equipments connected to the video apparatus by changing the encoding format classification in producing an operation signal in accordance with the operation of a key switch, the transmitter comprising a memory portion for memorizing a code indicating the format classification for each maker or type of machine for all kinds of object equipments to which the transmitter is applicable, an input portion for inputting selectively a preset mode for use in presetting the transmitter in a format conformable to the peripheral equipments, and a transmission control portion for controlling one of the codes memorized in the memory portion to be transmitted if the preset mode is selected through the input portion, and then an instruction for activating the peripheral equipments to be transmitted in a format corresponding to the code, repeating the transmission for all the codes memorized in the memory portion in succession at an interval T.

Herein, the video apparatus may be a magnetic recording/reproducing apparatus, for example. The peripheral equipments connected to the video apparatus includes a television receiver, when the video apparatus is the magnetic recording/reproducing apparatus, or the video apparatus itself may be the television receiver. Namely, the video apparatus and the peripheral equipments usually include the television receiver.

In the multi remote control transmitter according to the invention, the code indicating the encoding format classification is memorized for each maker or type of machine for all kinds of object equipments to which the transmitter is applicable. If a preset mode is selected through the input portion, the transmission of the code followed by the instruction is repeated successively for all the codes at an interval T. Herein, the instruction is to activate the peripheral equipments connected to the video apparatus, and is transmitted in a format corresponding to the preceding transmission code. Therefore, when the code conforming to the peripheral equipments is transmitted, the activation of the peripheral equipments is made, and can be detected as a video signal. Accordingly, the format conformable to the peripheral equipments can be simply recognized by displaying the code.

Also, according to the invention, there is provided a video apparatus that is remotely operated by the multi control remote control transmitter, and allows the connection of the peripheral equipments, comprising an input terminal for inputting a video signal output from the peripheral equipments, a receiving portion for receiving an operation signal transmitted from the multi remote control transmitter, and a control portion for controlling each portion on the basis of the operation signal input through the receiving portion, in which the control portion has the code input through the receiving portion, and if a video signal is input through the input terminal within an interval T since the time when the code is input, the code is displayed as a format conforming to the peripheral equipments.

With this display output, the format conforming to the peripheral equipments can be simply recognized by displaying the code.

In the video apparatus according to the invention, the memory portion for memorizing the data for explaining the preset method of the multi remote control transmitter according to the invention is provided, and the control portion controls the data memorized in the memory portion with the code to be displayed.

With this display and output configuration, the data for explaining the present method of the transmitter, with the code of format conforming to the peripheral equipments, can be displayed.

In the video apparatus according to the invention, one of the peripheral equipments is a television receiver, and the control portion controls the code to be displayed on the television receiver.

With this configuration, the code for the format conforming to the peripheral equipments, and further the data for explaining the preset method of the transmitter are displayed on the television receiver.

Also, according to the invention, there is provided a format preset support method for the multi remote control transmitter, wherein the code is displayed on the video apparatus or the peripheral equipments connected to the video apparatus, employing the multi remote control transmitter.

With the format preset support method, the code for the format conforming to the peripheral equipments, and further the data for explaining the preset method of the transmitter are displayed on the video apparatus or the peripheral equipments connected to the video apparatus.

BRIEF DESCRIPTION OF THE DRAWINGS

FIG. 1 is a block diagram showing the configuration of hardware according to one embodiment of the present invention.

FIG. 2

FIG. 3

FIGS. 3A to 3E are a timing chart showing the operation of equipments when the software is executed.

DETAILED DESCRIPTION OF THE PREFERRED EMBODIMENTS

Embodiments

Figure 1:
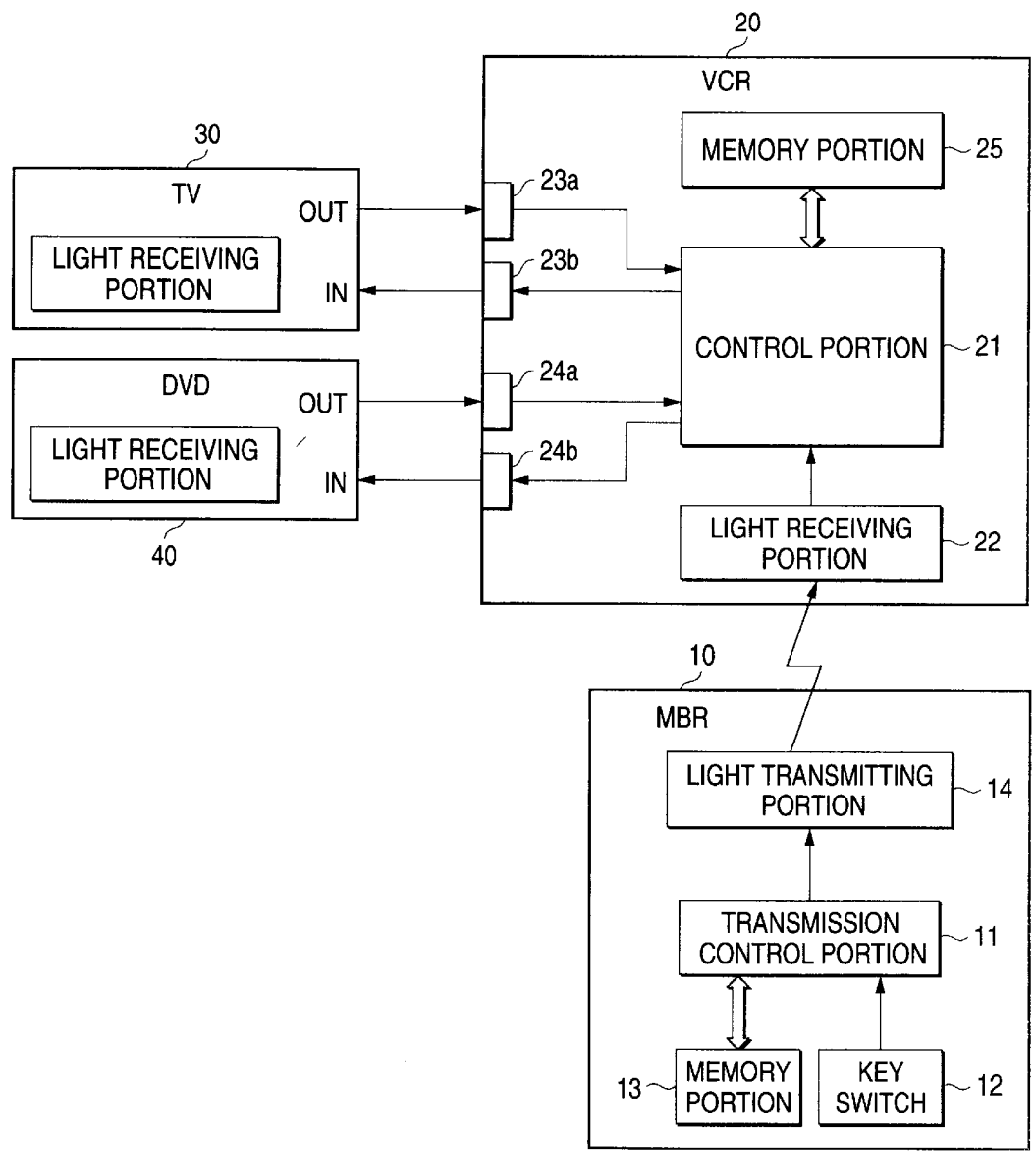
FIG. 1
Figure 2A:
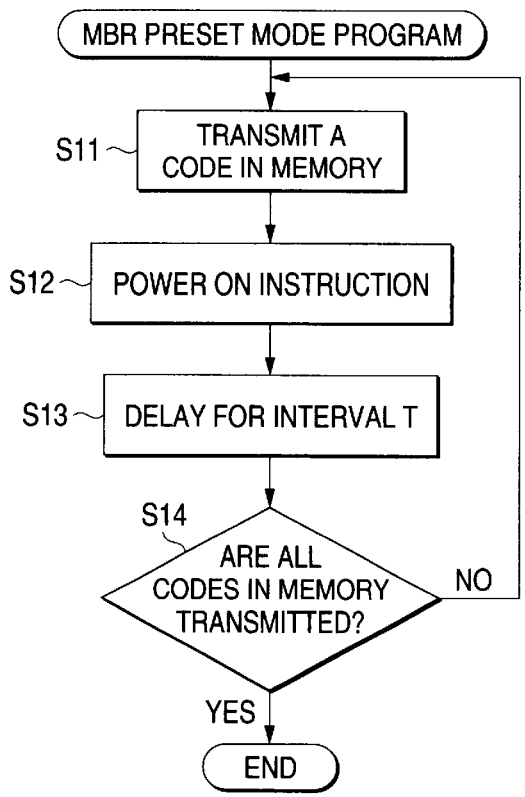
FIGS. 2A and 2B are flowcharts showing a software of this embodiment.
Figure 2B:
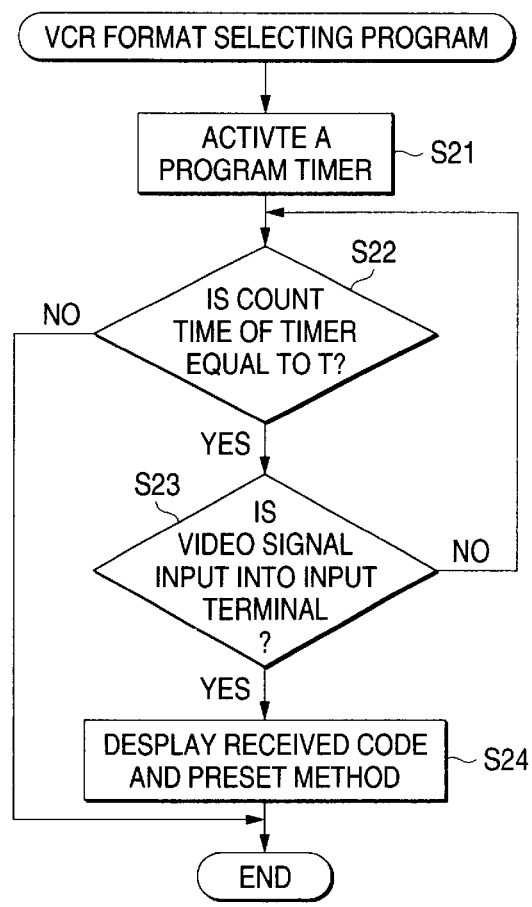

The preferred embodiments of the present invention will be described below with reference to the accompanying drawings. FIG. 1 is a block diagram showing the device configuration of hardware according to one embodiment of the invention. FIGS. 2A and 2B are flowcharts showing a software in the embodiment. FIGS. 3A to 3E are a timing chart showing the equipments operation when the software is executed.

In this embodiment, the invention is practiced in a multi remote control device 10 (hereinafter referred to as an MBR 10) for a video apparatus and a television receiver 20 containing a magnetic recording/reproducing apparatus (hereinafter referred to as a VCR 20) as the video apparatus, as shown in FIG. 1.

The MBR 10 is attached to the VCR 20. The MBR 10 can of course remotely operate the VCR 20, as well as the peripheral equipments, such as a television receiver 30 (hereinafter referred to as a TV 30) and an optical disk reproducing apparatus (hereinafter referred to as a DVD 40), which are connectable to the VCR 20, by changing the encoding format in encoding the code in accordance with the operated condition of a key switch.

The MBR 10 is provided with a transmission control unit 11 constituted of a microcomputer. The transmission control unit 11 encodes various kinds of code generated by the operation of a key switch 12 in a format for VCR 20, modulates a carrier signal in accordance with an encoded signal, and transmits a modulated signal as the infrared signal from a light transmitting portion 14, whereby the VCR 20 can effect various operations, including the power on or off, volume adjustment, channel switch, and tape deck operation.

To control this series of operations, the transmission control portion 11 sends or receives the data to or from a memory portion 13. The memory portion 13 has the format identification codes indicating the encoding format classification memorized as one recording data, for all the object machines to which the MBR 10 is applicable.

The VCR 20 has a control portion 21 constituted of a microcomputer. The control portion 21 controls the VCR 20 as a whole, and as one of the control functions, makes a control corresponding to each code on the basis of various kinds of code input via the light receiving portion 22 from the light transmitting portion 14.

To an input port of the control portion 21, there are connected an input terminal 23a for TV and an input terminal 24a for DVD, in addition to the light receiving portion 22. To an output port of the control portion 21, there are connected an output terminal 23b for TV and an output terminal 24b for DVD. The input terminal 23a and the output terminal 23b for TV are connected to an output terminal and an input terminal for TV 30, respectively. And the input terminal 24a and the output terminal 24b for DVD are connected to an output terminal and an input terminal for DVD 40, respectively. The memory portion 25 that is combined with the control portion 21 memorizes the data for explaining a preset method of the MBR 10, as one of the recording data.

Each of the TV 30 and the DVD 40 has a light receiving portion, like the VCR 20, and has a control corresponding to each code on the basis of various kinds of code input via the light receiving portion.

Referring now to FIG. 2, a function in this embodiment, particularly, a preset support function that is performed by the transmission control portion 11 within the MBR 10 and the control portion 21 within the VCR 20 will be described below.

If a preset mode is selected by the operation of the key switch 12 in the MBR 10, a program of FIG. 2A is started.

In the MBR 10, if this preset program is started, a format identification code indicating the encoding format classification is read from the memory portion 13, and the first code (code 1) is transmitted from the light transmitting portion 14 (S11). This code signal is encoded in a format conforming to the VCR 20.

Subsequently to the transmission of the first code (code 1), an instruction of power on is transmitted from the light transmitting portion 14 (S12). This instruction code is encoded in a format represented by the first code (code 1).

If the instruction of power on is ended, a delay time of interval T is secured (S13). For all the format identification codes, the code transmission, the instruction of power on and keeping the delay time are performed (S14).

Thereby, all the format identification codes, and the instruction of power on encoded in the format of each code are transmitted from the light transmitting portion 14 at every interval T.

On the other hand, in the VCR 20, a code selecting program of FIG. 2B is started, every time any one of all the format identification codes transmitted is received.

If this program is started in the VCR 20, a program timer starts to operate (S21). It is determined whether or not the clocking period by the timer reaches the term T (S22). While the clocking period by the timer reaches the term T, it is checked whether or not a video signal is input into the input terminal 23a for TV and the input terminal 24a for DVD (S23).

When a video signal is input into the input terminal 23a for TV, the latest format identification code received at this time, as a conformable code of the TV 30 connected to the input terminal 23a, is displayed on the TV 30 via the output terminal 23b for TV, and the data for explaining the preset method of the MBR 10 is read from the memory portion 25, and displayed via the output terminal 23b for TV on the TV 30 (S24).

Also, when a video signal is input into the input terminal 24a for DVD, the latest format identification code received at this time, as a conformable code of the DVD 40 connected to the input terminal 24a, is displayed on the TV 30 via the output terminal 23b for TV, and the data for explaining the preset method of the MBR 10 is read from the memory portion 25, and displayed via the output terminal 23b for TV on the TV 30 (S24).

For displaying the data, an OSD circuit (On Screen Display circuit) is employed which is able to display various kinds of data as a video signal on the TV 30.

This code selecting program is executed for all the format identification codes received, viz., all the codes indicating the encoding format classification. Thereby, the conformable format of the TV 30 or DVD 40, as the peripheral equipments, connected to the VCR 20 is chosen. This choosing operation will be described below with reference to FIGS. 3A to 3E.

In the VCR 20, the format identification code is received at every interval T, as shown in FIG. 3A. Since each code is encoded in the format for VCR 20, it is received by the VCR 20 alone, but not by the TV 30 or DVD 40.

Supposing that the first format identification code (code 1) conforms to the TV 30, an instruction power on that is transmitted following that code is received by the TV 30 alone, as shown in FIG. 3B. This is because this instruction is encoded in a format conforming to the TV 30. When this instruction is received by the TV 30, the TV 30 is powered on, and a video signal is output from its output terminal.

As a consequence, in the VCR 20, a video signal from the TV 30 is input into the input terminal 23a for TV, its input being detected by the control portion 21, as shown in FIG. 3C. Upon this detection, the control portion 21 determines that the first format code (code 1) is adapted to the TV 30. The code 1 and the data for explaining the preset method of the MBR 10 is output with a video signal to the output terminal 23b for TV, as shown in FIG. 3D.

In this way, the code 1 that is in the format conforming to the TV 30, and the explanation for the preset method of the MBR 10 are displayed on the screen of the TV 30.

The user can recognize that the format of code 1 is adaptable to the TV 30 from the video picture displayed on the screen of the TV 30, and presets the format of code 1 in the MBR 10. This preset operation can be simply effected in accordance with an explanation displayed on the screen of the TV 30.

In the case where the second format identification code (code 2) corresponds to the DVD 40, the DVD 40 responds to an instruction of power on originated following the code 2, as shown in FIG. 3E. The control portion 21 recognizes that the code 2 corresponds to the DVD 40, from a video input appearing at the input terminal 24a for DVD, and outputs this code 2, together with the data for explaining the preset method of the MBR 10, to the output terminal 23b for TV.

Thus, in this embodiment, when the MBR 10 attached to the VCR 20 as the video apparatus is preset in the format of the peripheral equipments including the TV 30 and the DVD 40 connected to the VCR 20, the code of its format is displayed with video on the screen of the TV 30, whereby the format can be simply found without taking a troublesome procedure of examining the maker or type of machine, and the manufacture date of the peripheral equipments including the TV 30 and the DVD 40 and collating them with the operation manual.

Also, since the explanation for the preset method of the MBR 10 is displayed together with the conformable format on the screen of the TV 30, the preset operation can be simply effected without seeing the operation manual.

Also, the conformable format is detected upon powering on the peripheral equipments connected to the VCR 20, but the detection of power on is made by input of a video signal from the peripheral equipments to the VCR 20. A sensor for this detection is not required to be provided in the MBR 10. Accordingly, the circuit configuration of the MBR 10 is simplified, and the manufacturing costs are reduced.

In the above embodiment, the format of the MBR 10 for VCR is preset. However, the invention is also applicable to the case where the format of the MBR for TV or the MBR for DVD is preset. When the format of the MBR for TV is preset, the format identification code can be displayed on the TV. Similarly, the format identification code can be displayed on the TV screen for the VCR 20.

Effect of the Invention

As described above, with the multi remote control transmitter of the invention, employing the video apparatus attached to the transmitter, the code of the format of the peripheral equipments connected to the video apparatus can be output. Accordingly, the format can be simply selected with a simple circuit configuration not using an expensive sensor, and without seeing the operation manual.

With the video apparatus of the invention, the code of the format of the peripheral equipments connected to the video apparatus, and additionally the data for explaining the preset method of the multi remote control transmitter can be displayed employing the video apparatus. Accordingly, the format of the peripheral equipments can be simply selected without the use of an expensive sensor, and without seeing the operation manual, and preset in the multi remote control transmitter.

With the format preset support method of the multi remote control transmitter of the invention, the code of the format of the peripheral equipments connected to the video apparatus, and additionally the data for explaining the preset method of the multi remote control transmitter can be displayed employing the video apparatus. Accordingly, the format of the peripheral equipments can be simply selected without the use of an expensive sensor, and without seeing the operation manual, and preset in the multi remote control transmitter.

What is claimed is:

1. A multi remote control transmitter for a video apparatus having a function of allowing a remote operation of, in addition to said video apparatus, peripheral equipments connected to said video apparatus by changing an encoding format classification in producing an operation signal in accordance with the operation of a key switch, said multi remote control transmitter comprising:

a memory portion for memorizing a code indicating the format classification for each maker or type of machine for all kinds of object equipments to which said transmitter is applicable, an input portion for inputting selectively a preset mode for use in presetting said transmitter in a format conformable to the peripheral equipments, and a transmission control portion for controlling one of the codes memorized in said memory portion to be transmitted if the preset mode is selected through said input portion, and then an instruction for activating the peripheral equipments to be transmitted in a format corresponding to the code, repeating the transmission for all the codes memorized in said memory portion in succession at an interval T.

2. The video apparatus that is remotely operated by said multi control remote control transmitter according to claim 1 to allow the connection of the peripheral equipments, comprising:

an input terminal for inputting a video signal output from the peripheral equipments, a receiving portion for receiving an operation signal transmitted from said multi remote control transmitter, and a control portion for controlling each portion on the basis of the operation signal input through said receiving portion, wherein the code is input into said control portion through said receiving portion, and if a video signal is input through said input terminal within an interval T since a time when the code is input, the code is displayed as a format conformable to the peripheral equipments.

3. The video apparatus according to claim 2, further comprising:

a memory portion for memorizing the data for explaining a preset method of the multi remote control transmitter according to claim 1, wherein said control portion controls the code and the data memorized in said memory portion to be displayed.

4. The video apparatus according to claim 2, wherein one of the peripheral equipments is a television receiver, and said control portion controls the code to be displayed on said television receiver.

5. A format preset support method for a multi remote control transmitter, wherein the code is displayed on said video apparatus according to claim 1 or on the peripheral equipments connected to said video apparatus, employing said multi remote control transmitter according to claim 1.

* * * * *